United States Patent
Pena et al.

(10) Patent No.: US 11,609,832 B2
(45) Date of Patent: Mar. 21, 2023

(54) SYSTEM AND METHOD FOR HARDWARE COMPONENT CONNECTIVITY VERIFICATION

(71) Applicant: International Business Machines Corporation, Armonk, NY (US)

(72) Inventors: Jarom Pena, Pflugerville, TX (US); Jose Morales, Leander, TX (US); David Green, Austin, TX (US); Donna Johnson, Pflugerville, TX (US); Rodolfo Lopez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 16/593,659

(22) Filed: Oct. 4, 2019

(65) Prior Publication Data

US 2021/0103510 A1    Apr. 8, 2021

(51) Int. Cl.
    *G06F 11/22*    (2006.01)
    *H01R 43/26*    (2006.01)
    *G06F 1/26*     (2006.01)

(52) U.S. Cl.
    CPC .......... *G06F 11/2284* (2013.01); *G06F 1/263* (2013.01); *H01R 43/26* (2013.01)

(58) Field of Classification Search
    CPC ...... G06F 11/2284; G06F 1/263; H01R 43/26
    See application file for complete search history.

(56) References Cited

U.S. PATENT DOCUMENTS

| 6,182,248 B1 | 1/2001 | Armstrong et al. |
| 6,401,157 B1 | 6/2002 | Nguyen et al. |
| 6,725,368 B1 * | 4/2004 | Liebenow ........... G06F 11/2284 714/E11.149 |
| 6,901,344 B2 | 5/2005 | Mantey et al. |
| 7,146,542 B2 * | 12/2006 | Srinivasan .......... G06F 11/0748 719/327 |

(Continued)

OTHER PUBLICATIONS

Boubezani et al., "Testability Analysis and Test-Point Insertion in RTL VHDL . . . for Scan-Based BIST", IEEE Transactions on, vol. 18, No. 9, pp. 1327-1340, Sep. 1999.

(Continued)

*Primary Examiner* — Matthew M Kim
*Assistant Examiner* — Matthew N Putaraksa
(74) *Attorney, Agent, or Firm* — Scully, Scott, Murphy & Presser, P.C.

(57) ABSTRACT

System, apparatus, and/or a method for checking hardware components in an information handling system is disclosed that includes selecting a hardware component for testing; supplying power to the hardware component independent from the power supply provided by the information handling system; performing testing on the selected hardware component using power supplied by the independent power supply; determining the success or failure of the testing on the selected hardware component; indicating the result of the testing on the selected hardware component; and if the result of the testing on the selected hardware component is successful indicate the hardware component passed the testing, and if the result of the testing on the selected hardware component is not successful re-seat the hardware component and perform the testing on the selected hardware again.

18 Claims, 6 Drawing Sheets

(56) References Cited

U.S. PATENT DOCUMENTS

| | | | |
|---|---|---|---|
| 7,913,379 B2 | 3/2011 | Bodenweber et al. | |
| 8,631,458 B1 | 1/2014 | Banerjee | |
| 9,002,694 B2 | 4/2015 | Feng et al. | |
| 9,355,055 B1 | 5/2016 | Klein et al. | |
| 9,476,941 B2 | 10/2016 | Whetsel | |
| 9,514,267 B2 | 12/2016 | Harer et al. | |
| 9,568,970 B1 | 2/2017 | Kaushal et al. | |
| 9,576,240 B2 | 2/2017 | Jeong et al. | |
| 9,697,306 B1 | 7/2017 | Haridass et al. | |
| 10,101,389 B2 | 10/2018 | Lin | |
| 10,111,070 B2 | 10/2018 | Zakaria et al. | |
| 10,140,164 B2 | 11/2018 | Mehta et al. | |
| 10,171,313 B2 | 1/2019 | Diaz et al. | |
| 10,223,166 B2 | 3/2019 | Jamjoom et al. | |
| 10,223,762 B2 | 3/2019 | Ashari et al. | |
| 10,545,553 B2* | 1/2020 | Borlick | G06F 1/266 |
| 2004/0090341 A1* | 5/2004 | Hendrickson | G06F 11/2247 |
| | | | 714/E11.146 |
| 2004/0215953 A1* | 10/2004 | Cantwell | G06F 9/4418 |
| | | | 713/2 |
| 2009/0100295 A1* | 4/2009 | Hiew | G07C 9/257 |
| | | | 714/29 |
| 2009/0271776 A1* | 10/2009 | Schreier | G06F 11/1417 |
| | | | 717/170 |
| 2011/0221448 A1* | 9/2011 | Sowders | H01H 83/12 |
| | | | 324/510 |
| 2015/0242483 A1 | 8/2015 | Zhou et al. | |
| 2016/0283361 A1* | 9/2016 | Alexander | G06F 11/3648 |
| 2017/0192825 A1 | 7/2017 | Biberman et al. | |
| 2017/0227601 A1* | 8/2017 | Benaben | G01R 31/27 |
| 2017/0331763 A1 | 11/2017 | Li et al. | |
| 2017/0347327 A1 | 11/2017 | Rahman et al. | |
| 2018/0139271 A1 | 5/2018 | Kumar et al. | |
| 2018/0314318 A1 | 11/2018 | Remis et al. | |
| 2018/0332107 A1 | 11/2018 | Marr et al. | |
| 2019/0004581 A1 | 1/2019 | Borlick et al. | |
| 2019/0139185 A1 | 5/2019 | Baggerman | |
| 2019/0147122 A1 | 5/2019 | Elliott | |
| 2019/0258537 A1* | 8/2019 | Chou | G01R 1/07342 |
| 2020/0117565 A1* | 4/2020 | Ponnuvel | G05D 1/0088 |
| 2020/0403897 A1* | 12/2020 | Dai | H04L 43/0829 |
| 2021/0091557 A1* | 3/2021 | Meisinger | H02H 3/006 |
| 2021/0240561 A1* | 8/2021 | Shah | G06F 11/0793 |
| 2021/0263111 A1* | 8/2021 | Magno | G01R 31/327 |
| 2021/0286694 A1* | 9/2021 | King | G06F 11/27 |
| 2022/0157396 A1* | 5/2022 | Geiger | G01R 31/2863 |
| 2022/0270703 A1* | 8/2022 | Chandramani | G11C 29/44 |

OTHER PUBLICATIONS

Macko et al., "Verification of Power-Management Specification . . . System Design", Journal of Circuits, Systems and Computers, vol. 26, No. 8, pp. 1-22, Feb. 10, 2017.

Mukherjee et al., "Formal Verification of Hardware/Software Power Management Strategies", VLSID'13 ACM/IEEE 26th International Conference on, pp. 326-331, Jan. 5-10, 2013.

Yeung et al., "Multi-Domain Verification: When Clock, Power and Reset Domains Collide", DVCon 2015, Design and Verification Conference on, pp. 1-11, May 2015.

* cited by examiner

SYSTEM AND METHOD FOR HARDWARE COMPONENT CONNECTIVITY VERIFICATION

BACKGROUND

The present invention relates to hardware component verification, including systems, apparatus, and methods to test and check hardware component or field replacement unit (FRU) connectivity issues.

With recent advancement of information technology and wide use of the Internet, more and more demands are placed on the acquisition, processing, storage, and dissemination of information by information handling systems, e.g., computing systems. Information handling systems are being developed to increase the speed at which they are able to execute increasingly complex applications for business, personal use, and entertainment. Overall system performance is affected by each of the key elements of the information handling system, including the performance of interfaces and the connectivity of various components, cards, boards, adapters, modules, etc.

The constantly increasing speed of information handling systems which execute increasingly complex applications places more rigorous performance demands on the information handling systems which are becoming increasingly complex and require increasing number of circuits, chips, cards, boards, adapters, modules, and hardware. Connectivity, or the lack of a dependable connection, between the various hardware components, circuits, chips, cards, boards, FRUs, adapters, and modules can lead to failures, downtime and inefficiency in information handling systems.

System assembly, reconfiguration and component replacement typically require human interaction with hardware components during the product life cycle of an information handling or data processing system, e.g. a server or computer system. Each of these events can render the system susceptible to faulty connectivity between the hardware components. Faulty connectivity can result in failure or interrupt the power-on process of an information handling or data processing system. When attempting to power-on an information handling or data processing system, it is common practice for developers, test engineers, product engineers, customers, personnel, and users to replace hardware components or Field Replaceable Units (FRUs), and/or to reseat hardware components or FRUs (e.g., components, component cards, modules, etc.) to ensure proper connectivity. The user, however, may not know that the hardware, e.g., components, cards, boards, FRUs, etc., are properly situated or seated until the system, apparatus, and/or machine executes and completes a power-on process. During the power-on process several connectivity checks, and component training, are performed. This power-on process typically is dependent upon variables such as system type, configuration, and test setup to list a few. In some cases it can take up to an hour for a single power-on process to complete. A connectivity issue may not be detected and reported until the respective connectivity test is executed during or after completion of the power-on process. Once a connectivity issue is detected, the event typically is reported and acknowledged by an agent who will later tend to the issue.

Reported faults or issues with hardware can include faulty hardware, communication errors, or seating issues. In the case of faulty hardware, a simple swap will resolve the issue. If this could be indicated at the time of insertion, likely while an agent is present to take action on the suspected problem, downtime is decreased and efficiency improved, especially in the case of a manufacturing production line. In the case of communication errors, if the interrupt can be isolated from the greater system to a specific sub-component, then debugging, and triage of communication errors could be greatly impacted and improved. Seating issues occur where hardware components, e.g., components, chips, cards, boards, modules, and/or FRUs, are not properly seated in a receptacle, receiver, and/or connector which results in improper or faulty connectivity. Improper connectivity can result in information system down-time and has explicit and implicit financial impacts. Thus discovering improper seating issues early can reduce information system, e.g., server, downtime and lessen financial and resource impact. Additionally, seating issues discovered earlier in the power-on process allow for more efficient power-on procedures. Interrupts in the power-on process hinder product development and increase costs. Managing such events impact the manufacturing and assembly process. In addition, when an interrupt occurs in the customer environment, the server downtime impacts the client and their customers, while also marring business reputation from a reliability standpoint.

SUMMARY

The summary of the disclosure is given to aid understanding of a system, apparatus, and method for testing, checking and/or verifying hardware components including testing, checking, and/or verifying sufficient and proper connection and connectivity between hardware components, e.g., cards, modules, boards, FRUs, etc., and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the system, apparatus, and method for testing, checking, and/or verifying hardware components, including testing, checking, and/or verifying sufficient and proper connection and connectivity between hardware components, e.g., cards, modules, boards, FRUs, etc., to achieve different effects.

A method for checking one or more hardware components in an information handling system according to an embodiment is disclosed. The method in an aspect includes selecting a hardware component for testing; supplying power to the hardware component independent from the power supply provided by the information handling system during a power-up sequence; performing testing on the selected hardware component using power supplied by the independent power supply; determining the success or failure of the testing on the selected hardware component; indicating the result of the testing on the selected hardware component; and if the result of the testing on the selected hardware component is successful indicate the hardware component passed the testing, and if the result of the testing on the selected hardware component is not successful re-seat the hardware component and perform the testing on the selected hardware again using power supplied by the independent power supply. In a further option the method includes inserting the hardware component into a receptacle on a board, and according to an embodiment inserting the hardware component into a receptacle on a board includes plugging an in-line insert into the receptacle and inserting the hardware component into the in-line insert. The independent power supply in one or more embodiments consists of at least one of the group consisting of a capacitor, a supercapacitor, a battery, and combinations thereof. Additionally or alternatively, supplying power to the hardware component includes connecting an independent power source to the testing circuitry.

The method in an embodiment further includes in response to unsuccessful testing on the hardware component, comparing the number of times testing of the hardware component has been performed to a threshold, and if the number of times the hardware component has been tested is less than the threshold re-seating and retesting the hardware component, and in response to the number of times testing on the hardware component has been performed is equal to or greater than the threshold, indicating the hardware component as a failure. The threshold in an aspect is a predetermined number of testing performances of the hardware component. The testing in one or more embodiments comprises checking for at least one of the group consisting of faulty hardware, communication errors, connectivity issues, and combinations thereof. In an embodiment, the method includes initiating the testing in response to plugging the component hardware into a receptacle. Additionally and/or alternatively, testing is initiated in response to an agent activating a physical mechanism, where the physical mechanism includes in an aspect depressing a button. Indicating the results of the testing in an embodiment includes activating a visible display.

In one or more embodiments, a method for testing the connectivity of one or more cards in an information handling system is disclosed where the method includes: inserting one or more cards into one or more receptacles in the information handling system, each card containing multiple circuits for performing operations in connection with the information handling system and each card has multiple connections with its respective receptacle in which it is inserted; supplying power to testing circuitry associated with the one or more cards, wherein the power supplied to the testing circuitry is different than and independent from the power supply for operating the multiple circuits for performing information handling system operations contained on each card; and testing the one or more cards using the independent power supply before the information handling system undergoes a power on sequence using the power supply for operating the multiple circuits for performing information handling system operations contained on the card. The method additionally in an embodiment further includes a multiple input multiple output (MIMO) device having multiple inputs where a result of the testing or the one or more cards is input to each input of the MIMO. In a further aspect, the output of the MIMO is used in the power on sequence of the information handling system.

A system for checking hardware components in an information handling system having a power supply and circuitry for handling and processing information is disclosed where in one or more embodiments, the system includes testing circuitry for testing one or more hardware components in an information handling system; an indicator for reporting the results of testing the one or more hardware components; and a power source to supply power to the circuitry for testing the one or more hardware components and to report the results of the testing of the one or more hardware components, wherein the power source to supply power to the circuitry for testing and reporting the results of the testing of the one or more hardware components is separate and independent of the power supply of the information handling system. According to an aspect, the circuitry for testing and reporting the results of the testing of the one or more hardware components is incorporated into at least one of the group consisting of the hardware component; the circuitry of the information handling system that is separate from the one or more hardware components; and an in-line insert that is received in a receptacle and that receives the hardware component.

BRIEF DESCRIPTION OF THE DRAWINGS

The various aspects, features, and embodiments of a system, apparatus, and method for testing, checking, and/or verifying hardware components, including testing, checking, and/or verifying sufficient and proper connection and connectivity between hardware components, e.g., cards, modules, boards, FRUs, etc., will be better understood when read in conjunction with the figures provided. Embodiments are provided in the figures for the purpose of illustrating aspects, features, and/or various embodiments of the system, apparatus, and method for testing, checking, and/or verifying hardware components, including testing, checking, and/or verifying sufficient and proper connection and connectivity between hardware components, e.g., cards, modules, boards, FRUs, etc., but the claims should not be limited to the precise arrangement, structures, features, aspects, embodiments, methods, devices, and/or systems shown, and the arrangements, structures, subassemblies, features, aspects, embodiments, methods, devices and/or systems shown may be used singularly or in combination with other arrangements, structures, subassemblies, features, aspects, embodiments, methods, devices, and/or systems.

DETAILED DESCRIPTION

Figure 1:
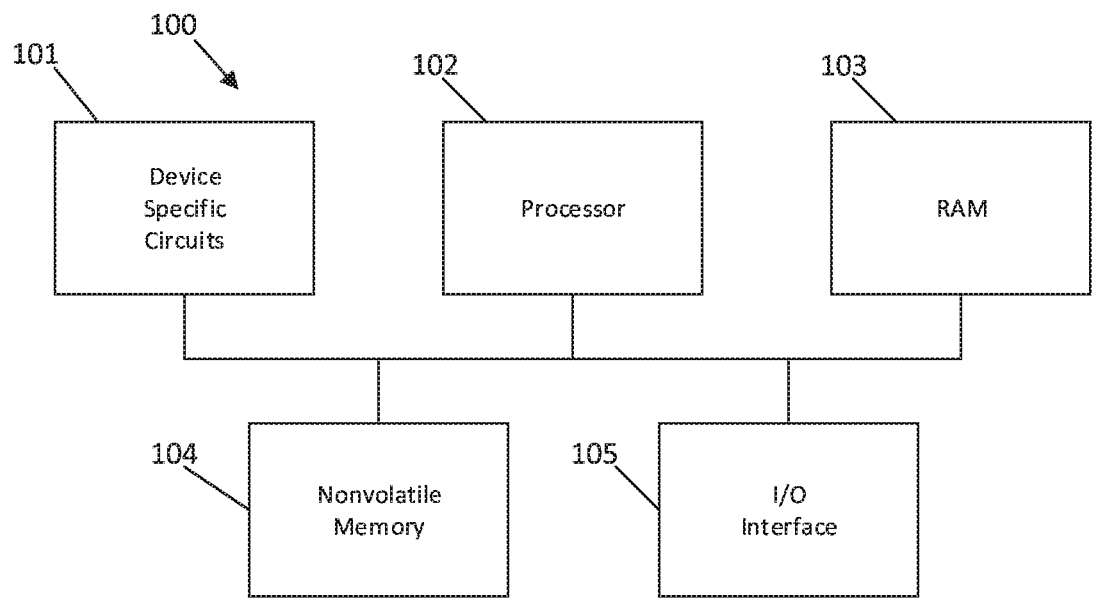
FIG. 1 depicts a general computing or data processing system in accordance with one embodiment.

The following disclosure is made for illustrating the general principles of the invention and is not meant to limit the inventive concepts claimed herein. In the following detailed description, numerous details are set forth in order to provide an understanding of a system, apparatus, and method for testing, checking and/or verifying hardware components, including testing, checking, and/or verifying sufficient and proper connection and connectivity between hardware components, e.g., cards, modules, etc., however, it will be understood by those skilled in the art that different and numerous embodiments of the system, apparatus, and/or method of testing, checking, and/or verifying hardware components, including checking, testing, and/or verifying the connectivity between hardware components, can be practiced without those specific details, and the claims and invention should not be limited to the embodiments, subassemblies, systems, structures, features, processes, methods, aspects, and/or details specifically described and shown herein. Further, particular features described herein can be used in combination with other described features in various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified and that the terms "comprises" and/or "comprising" specify the presence of stated feature, integers, steps, operations, elements, and/or components, but do not preclude the presence or addition of one or more features, integers, steps, operations, elements, components, and/or groups thereof.

During assembly and manufacture of information and data processing systems, e.g., computer servers or other hardware-based systems, there is no easy way to assemble the components, cards, boards, FRUs, and/or modules with full confidence that the components, cards, boards, FRUs, and/or modules are making proper electronic connectivity. In many cases, the connections between hardware components are hidden from plain view, may not be visible, or a sound and proper connection may not be visibly distinguishable from a faulty and poor connection. Additionally, during transport, there is a likelihood that components that rely upon mechanical connections can become dislodged or jostled in a manner to compromise the connection. Improper insertion of hardware components in information processing systems and other systems relying upon connectivity of hardware components can result in reliability failures with cost impacts due to unnecessary repair/service calls, erroneous repair of FRUs, or required repair to more than just the initial FRU/card due to other damage caused by improper component, card, board, module and/or FRU insertion.

This disclosure addresses suspect hardware components, including suspect interfacing and/or connectivity between hardware components, and in an aspect provides a system, apparatus, and/or method of checking hardware components including connectivity between hardware components in an information handling system. This disclosure assists in the assembly or manufacturing process so that electrical connections are sufficient, and are confirmed not only by visible inspection. The disclosed system, apparatus and/or method would also provide for a quick re-validation of the connectivity of hardware components in the field, for example after transport. In an embodiment, the connectivity check occurs prior to the power-on process of the information handling system. Applications of the checking or test system, apparatus, and/or method would be beneficial in recovering a failed system faster, minimizing downtime, enhancing reliability, and reducing cost. In the case of a visual indication, a preliminary check will provide a quicker acknowledgement of hardware component connectivity issues and can alleviate future failure in the power-on process as the result of improper hardware component seating.

The system, apparatus, and/or method in an embodiment preferably performs a real-time connectivity verification check. The system, apparatus, and/or method, in an aspect, is implemented prior to the information handling system power-on. In an embodiment, the system, apparatus, and/or method is implemented with an independent power source. The independent power source in an aspect permits the check to occur prior to the power-on process of the information handling system. In one or more embodiments, an in-line system, apparatus, and/or method for verification checking of hardware components is disclosed. For example, in an embodiment an interface is inserted between the hardware component and the receiver or receptacle that receives the hardware component. In one or more embodiments, an integrated system, apparatus, and/or method for verification checking of hardware components is disclosed. For example, additional circuitry is built into or integrated into either the hardware component or board (e.g., the board that contains the receiver or receptacle that receives the hardware component). The in-line or integrated system, apparatus, and/or method in an aspect has a power source that is independent of the power source for the component hardware and/or the information handling system (e.g., the board and/or server).

In an aspect, a more dynamic interface for the agent assembling the physical hardware components of an information handling system is disclosed in order to be able to confirm that the hardware components are properly assembled (e.g., the components, chips, cards, modules, etc. are properly seated) to meet a specified base-level criteria. By creating a visible indicator for the agent to respond to, and/or or permit manipulation of the hardware components as part of the checking system, apparatus and/or system, the efficiency of the power-on process is enhanced and improved, and the impact of interruptions in the field can be reduced and/or alleviated. The system, apparatus, and/or method in an embodiment performs basic connectivity checks prior to system power-on, preferably using a power supply that is independent of the information handling and/or hardware component power source. The testing process can be initiated either automatically or by manual input. The system, apparatus, and/or method can execute basic checks and/or more complicated checks and verifications. The system, apparatus, and/or method in an embodiment permits action to be taken on the hardware component by unplugging from, and/or re-seating, the hardware component in the receptacle that receives the hardware component, or other defined action. A system, apparatus and/or method in an embodiment will take action based on the connectivity test, preferably independent connectivity self-test. In an aspect, the system, apparatus, and/or method preferably will provide output (visual or otherwise) of the results of the testing.

One area where hardware components, integrated circuits, component cards, boards, modules, and/or FRUs, and the like are used is in information handling, data processing, and/or computing systems, including for example computer servers. The information handling, data processing, and/or computing systems may take many forms, and the components, chips, cards, boards, modules, and/or FRUs in an embodiment may include one or more processors, Random Access Memory (RAM) modules, DIMMs, nonvolatile memory, devices, device specific circuits, I/O interfaces, and I/O devices and peripherals, to name just a few.

A computing, data processing, and/or information handling system 100 may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
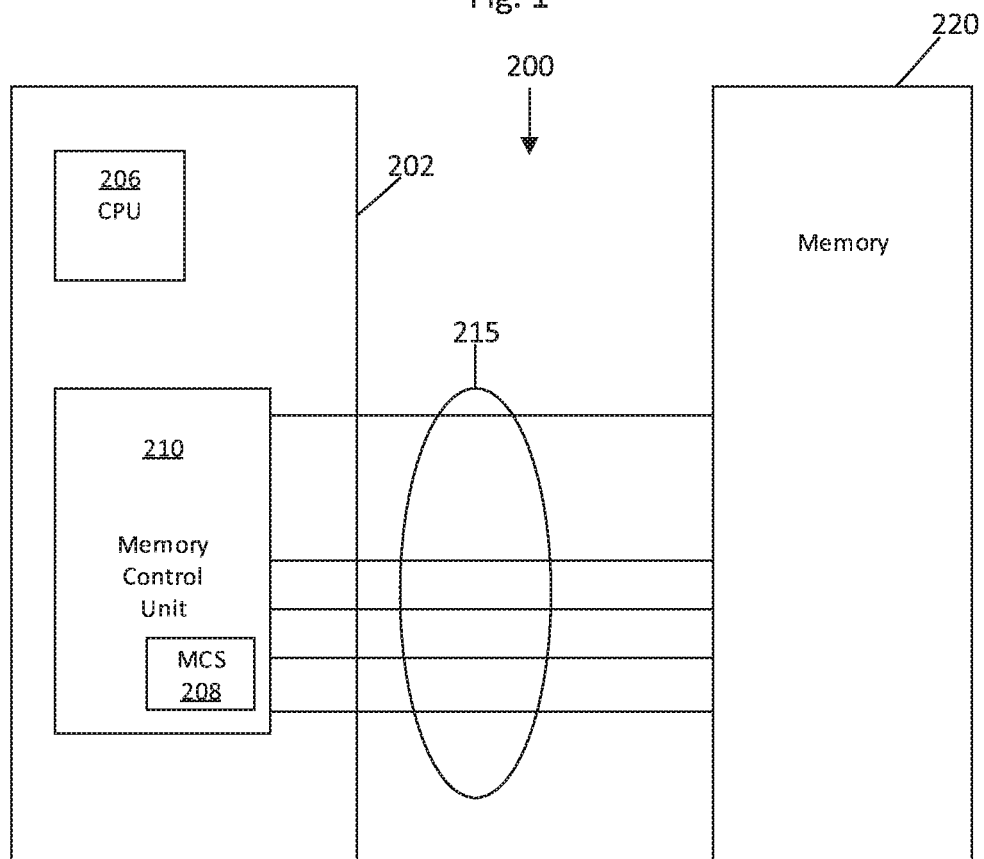
FIG. 2 depicts a memory subsystem in accordance with an embodiment.

FIG. 2 depicts an exemplary memory system 200 that may be part of a larger computer system structure or network. The computer system 200 includes a control processor system 202, which is a processing subsystem that includes at least one processor unit (CPU) 206 that may be configured to interface with a Memory Control Unit (MCU) 210. The processor or CPU 206 may be a module that processes read, write, and configuration requests from a system controller (not depicted). The processor 206 may be a multi-core processor. The MCU 210 may include a memory controller synchronous (MCS) 208, also referred to as a memory controller, that controls communication with one or more memory devices (not shown in FIG. 1) in a memory subsystem 220. The MCU 210 and the MCS 208 may include one or more processing circuits, or processing may be performed by or in conjunction with the processor 206. The control processor system 202 communicates with the memory subsystem 220 through a communications bus 215. Control processor system 202, processor or CPU 206, memory control unit 210, and MCS 208, individually and collectively, may be referred to herein as the Host. The Host as used herein is used broadly to refer to a processor, controller, or device that sends and receives command and/or control signals to a memory system or subsystem. The Host may also send and receive data signals from a memory system or subsystem.

Figure 3:
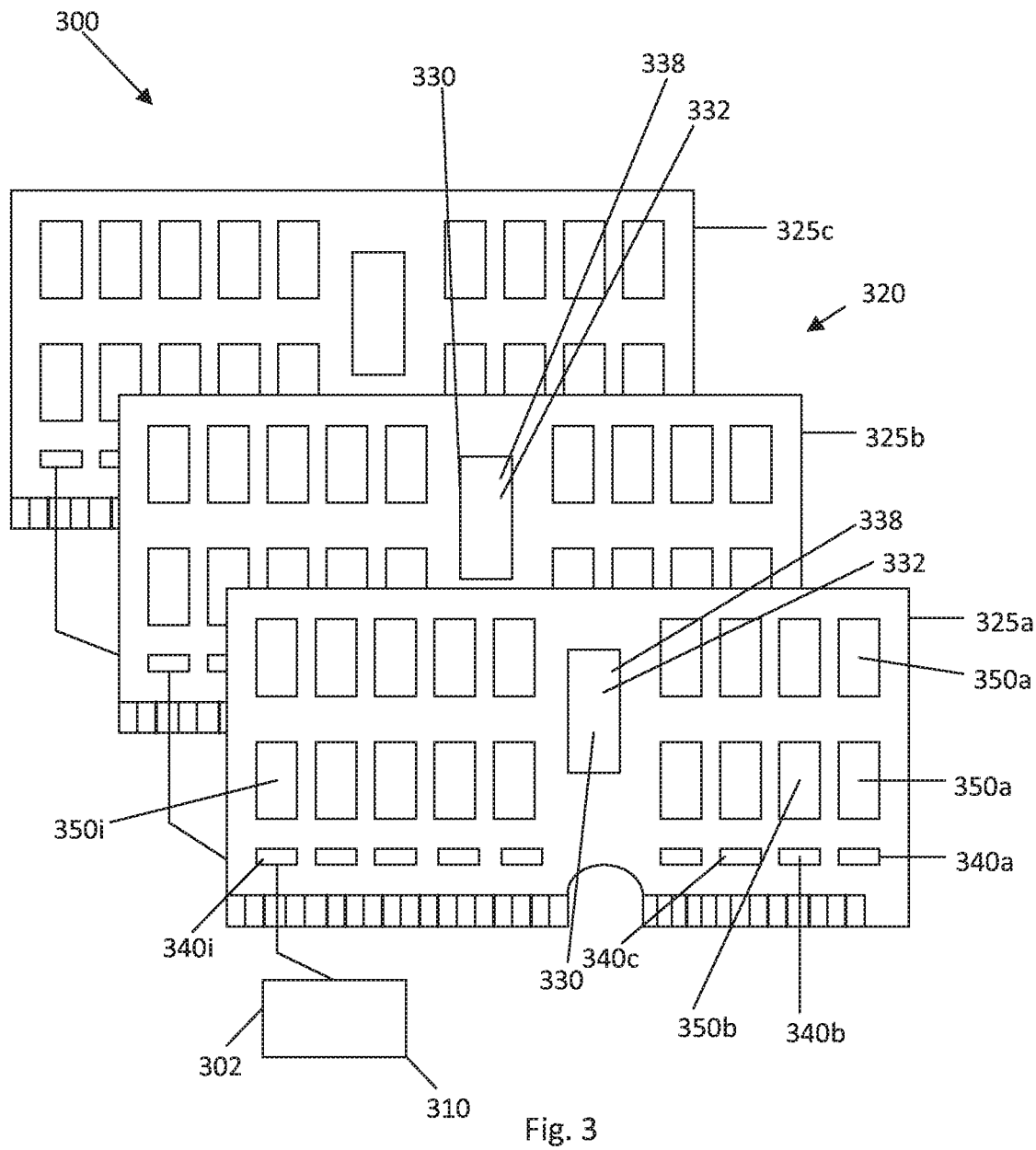
FIG. 3 depicts a memory subsystem including multiple memory cards having multiple DIMMs.

FIG. 3 depicts an example of a memory subsystem 320. Memory system 320 comprises a plurality of memory modules or memory cards, e.g., Dual Inline Memory Modules or DIMMs 325. While only three (3) DIMMs 325a-c are shown in FIG. 3, it will be appreciated that memory subsystem 320 may contain more or less DIMMs 325. The DIMMS are typically inserted into connectors or sockets which contain a receptacle or receiver to receive and make electrical connections with the DIMM. In instances, the DIMMs are inserted into riser cards which contain a receptacle or receiver to receive and make electrical connections with the DIMM. The DIMMs typically receive their power from the board through the connector into which the DIMMS are plugged, and/or from the information handling system power source. Each DIMM 325 may contain one or more volatile memory devices, e.g., Dynamic Random Access Memory chips or DRAMs 350. The memory devices 350 may be integrated circuits or chips and form the basic memory cells that hold bits of information. The memory subsystem may also include one or more memory control circuits 330, one or more data buffer or data (DC) circuits or (DC) chips 340, and one or more memory devices 350. The memory control circuit typically manages the flow of data going to and from the memory devices. The memory control circuit typically receives signals such as command and control signals from a Host, e.g., a Host processor. The memory control circuit may output command and control signals to the memory devices and/or data buffer circuits. The memory control circuit 330 in one embodiment may have a memory controller 332. The memory control circuit 330 or memory controller 332 may have a scheduler 338. The memory controller 332 and/or scheduler 338 may optimize the order of operations and instructions, and sends out signals to the data buffer circuits 340 and the memory devices 350. The data buffer circuits 340 buffer, receive, transmit, and/or transfer data between the Host, e.g., control processor system 302, and the memory devices 350.

In the example of FIG. 3, a distributed memory system 300 is illustrated having a memory control processor 302 and/or memory control unit 310, and a memory subsystem 320. The memory control unit 310, and/or memory control processor 302, may be a Host. The memory or data storage system 320 may be configured to store data and to provide storage services to one or more Hosts, which may be connected to the storage system 320 directly or through a network, (e.g., over the internet). The storage system may include an interface for supporting communications with the Host. Other configurations are contemplated for the memory module 325, and for the memory subsystem 320.

Figure 4:
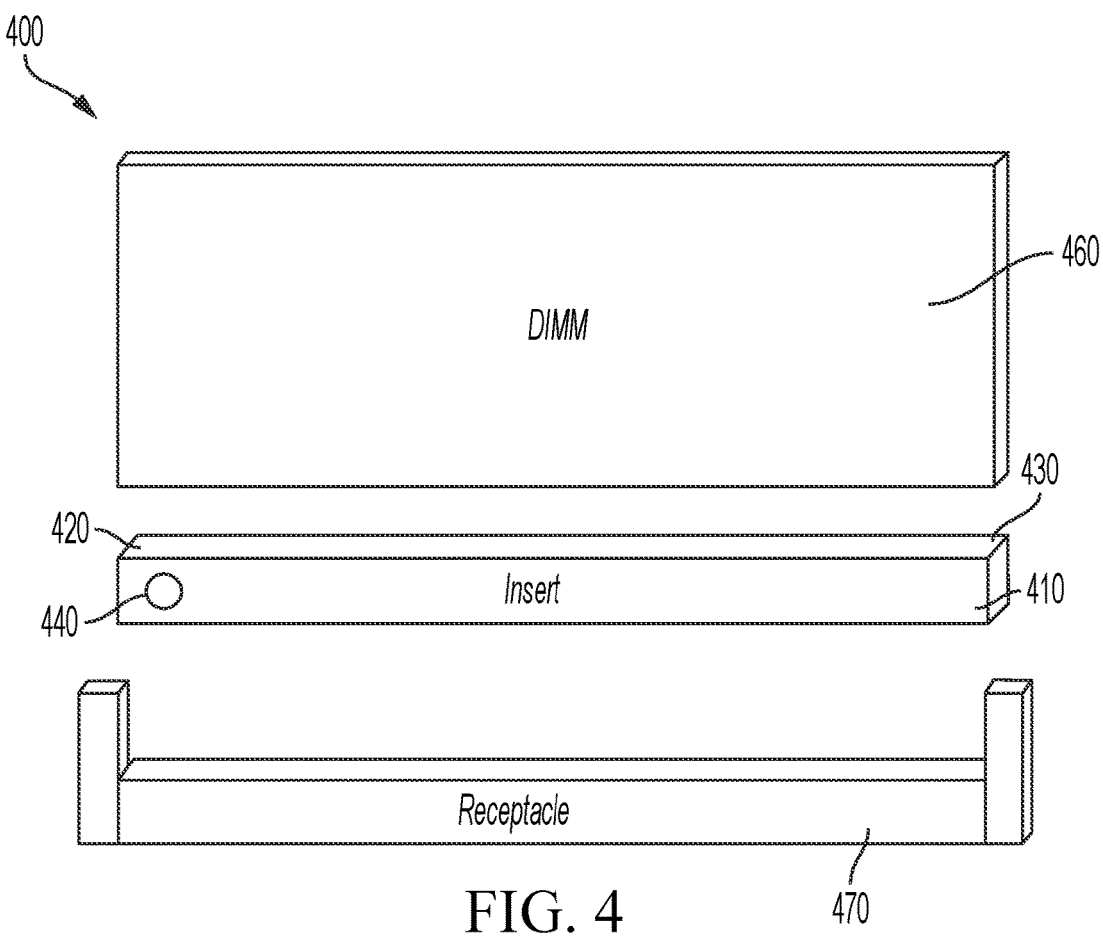
FIG. 4 depicts a hardware verification checker system in accordance with an embodiment.

FIG. 4 is an example embodiment of a system 400 for checking, testing, and/or verifying one or more hardware component(s) 460, e.g., a DIMM, card, board, module, FRU, etc., and in an embodiment connectivity of one or more hardware components 460 in receptacle or receiver 470. Receptacle or receiver 470 is generally attached to and electrically connected to a card, board, and/or module (not shown) containing electrical circuits, and the card, board and/or module many have a plurality of such receptacles, in addition to other circuitry. In addition, the board, card, and/or module that contain the receptacles 470 may itself be a card, board, and/or module that is inserted into a further receptacle.

The system 400 in one or more embodiments is in the form of an insert 410 that is independent of the hardware component 460 and the receptacle 470. The insert 410 is received in and makes electrical contact with the receptacle 470 and the various electrical connections in the receptacle 470. The insert 410 has a cavity or socket to receive the hardware component 460. The insert 410 has electrical pads, pins, and/or connectors to make contact with the various electrical connections of the hardware component 460. The insert 410 in FIG. 4 is configured as an in-line device, apparatus, and/or system 400 for testing hardware components 460, and in an embodiment the connectivity of hardware component 460 in receptacle 470. Insert 410, also referred to as connectivity checker 410, preferably in an embodiment has circuitry 420 to test the hardware component 460, and in an aspect the connectivity between the hardware component 460 received in insert 410 and the receptacle 470. The test circuitry 420 can be relatively simple to check if the electrical connections of the hardware component 460 in the receptacle 470, and in the insert 410, are sound. Additionally and/or alternatively, the test circuitry can be more complex and check for faulty hardware and/or communication errors. The test circuitry 420 in an aspect is built into the connectivity checker 410 and in one or more embodiments can be built-in, self-test circuitry. For example, in an embodiment, the connectivity checker 410 contains built-in, self-test circuitry 420 that initiates testing upon insertion of hardware component 460 into the insert 410. The connectivity checker 410 in accordance with one or more embodiments contains other physical circuitry 430.

In an aspect, connectivity checker 410 further contains an indicator and associated circuitry 440 that can alert an agent to one or more conditions, such as, for example, initiation of the test, completion of the test, and/or the results of the test. The indicator 440 can provide a visible display or indication, and/or an audible indication, of one or more conditions and/or results. For example, indicator 440 can be a colored light, e.g., an LED, where color is used to indicate conditions and results. For example, a yellow color for indicator 440 can indicate that the test has initiated. A green color for indicator 440 can indicate that the test has completed. Additionally, the green color by indicator 440 can indicate that the test results are compete and successful. A red color by indicator 440 can indicate a failure, or indicate a specific type of failure, e.g., a hardware failure, a connectivity issue, a communication error, etc. Other colors can be used to report other results, conditions, and/or specific failures. The indicator 440 can also use blinking and/or continuous lighting patterns, and changing lighting patterns to indicate conditions and/or results. Indicator 440 can also be a display panel that provides information, for example, text and/or symbols. Indicator 440 can also be audible such as a continuous beep, or an intermittent beep, or use pitch and frequency to report different conditions or results. For example, indicator 440 can be piezo-element, a speaker, or other audio device that in an embodiment can emit a beeping sound to indicate that the test is initiated and being performed. A change in audible emission from indicator 440 can also report on conditions or results. For example, a change from beeping to a continuous audible sound could indicate a failure or problem, which may indicate to reseat the hardware component 460 in the checker 410. The indicator 440 can also be both visible and audible. The indicator 440 in an embodiment can also indicate that the connectivity checker 410 is properly seated in the receptacle 470. When indicator 440 indicates a failure, in-line connectivity checker 410 provides the ability to reseat the hardware component 460, and recheck the hardware component 460, including the connectivity of hardware component 460. The reseating of the hardware component(s) can be performed manually by an agent, or automatically by for example a machine.

The in-line connectivity checker 410 in an embodiment can also indicate when proper insertion is reached, for example by indicator 440, and could serve as a buffer to protect the receptacle 470 from being damaged from pushing too hard on the hardware component 460 during insertion into the receptacle. For example, indicator 440 can light up when hardware component is properly inserted. The connectivity checker 410 can also contain other circuitry 430 that is in an embodiment configured to record and/or report the results of the testing. For example, the results can be indicated additionally and/or alternatively through Bluetooth, WiFi, or other communication means, and/or interface. The results of the connectivity tester 410 can also be recorded and/or reported using an in-line connection between the connectivity checker and a device (circuitry) to receive, collect, and/or store the results of the testing, which could include communications with, to and/or through the receptacle 470 (to the board and circuitry contained on the board to which the receptacle is attached), and/or to and through the hardware component 460.

A power supply or source 412 in one or more embodiments is provided on the connectivity checker 410 that is independent of the power source for the hardware component 460. Connectivity checker 410, in an embodiment further has a power source 412 independent of the receptacle 470 and/or the circuits (board) to which the receptacle 470 is attached, e.g., independent of the information handling system power source. The power source 412 in an aspect supplies power to testing circuitry 420. The power source 412 in an embodiment can also supply power to the additional circuitry 430 and/or the indicator 440. In one or more embodiments the power source 412 can be a super capacitor. Additionally and/or alternatively, the power source 412 can be a battery or other power supply able to power the circuitry 420 for the connectivity check 420, the other circuitry 430, and/or the indicator circuits 440. In one or more embodiments the power source can be remote from the connectivity checker 410 and be attached to (and unattached from) the connectivity checker 410, e.g., leads from a power source connected to connectivity checker 410.

Figure 5:
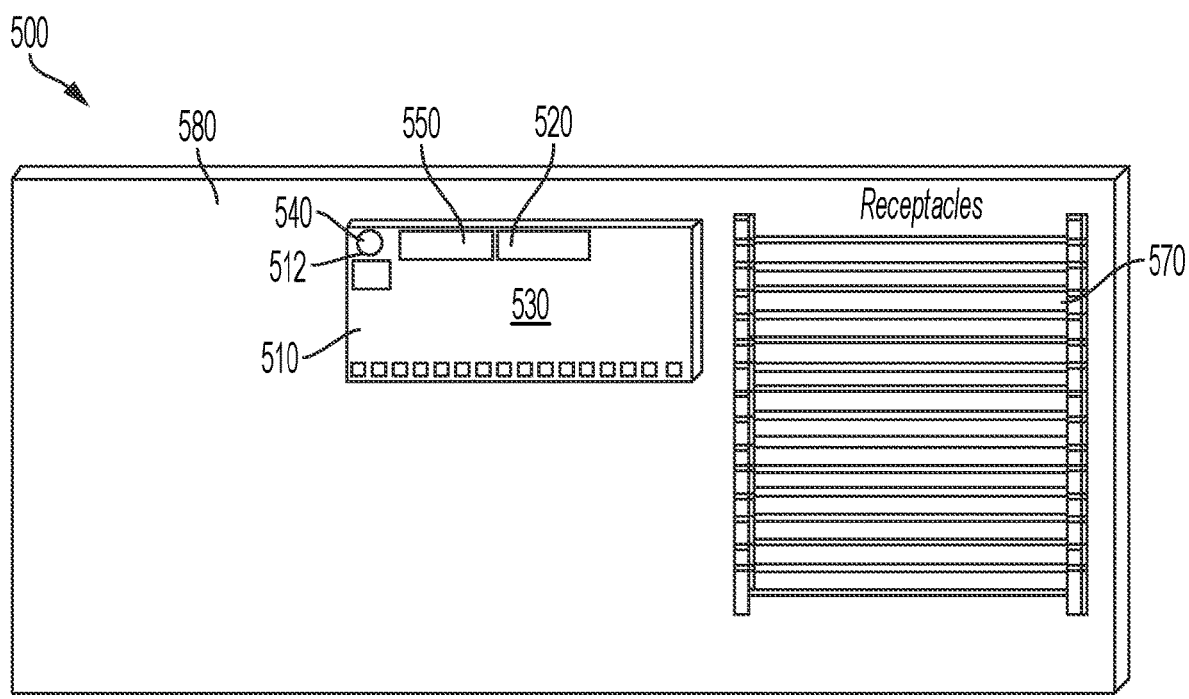
FIG. 5 depicts a hardware verification checker system in accordance with another embodiment.

FIG. 5 is an example embodiment of a system 500 for checking, testing, and/or verifying hardware components, including in one or more aspects checking, testing, and/or verifying the connectivity of one or more hardware components (not shown), e.g., a DIMM, card, board, module, FRU, etc., received in one or more receptacles or receivers 570 mounted on a board 580, e.g., a motherboard. Receptacles or receivers 570 are attached to, and electrically connected to a card, board, and/or module 580 containing electrical circuits. The system 500 in an embodiment includes connectivity checker 510 embedded or incorporated into the board 580. That is testing circuitry 520 in an embodiment is incorporated into and embedded into the board, e.g., motherboard. In an alternative embodiment, connectivity checker 510 can be mounted on or part of a card, module, FRU, and/or board that is plugged into a receptacle or receiver on the board 580.

The connectivity checker 510, preferably in an embodiment has circuitry 520 to test hardware components, including the connectivity between one or more hardware components (not shown for purposes of clarity) received in the one or more receptacles 570. The test circuitry 520 can be relatively simple to check if the electrical connections of the hardware component in the receptacle 570 are sound. Additionally and/or alternatively the test circuitry can be more complex and check for faulty hardware and/or communication errors. The test circuitry 520 in an aspect is built into the connectivity checker 510 including into the board 580 and in one or more embodiments can be built-in, self-test circuitry. For example, in an embodiment, the connectivity checker 510 contains built-in self-test circuitry 520 that initiates testing upon insertion of a hardware component into a receptacle 570. Additionally and/or alternatively, the checker 510 can include a mechanism 550, e.g., a button or latch, that can be activated by an agent to start and/or run the checks and tests. The connectivity checker 510 in accordance with one or more embodiments contains other physical circuitry 530.

In an aspect, connectivity checker 510 further contains an indicator and associated circuitry 540 that can alert an agent to one or more conditions, such as, for example, initiation of the test, completion of the test, and/or the results of the test. The indicator 540 can provide a visible display or indication, and/or an audible indication to indicate conditions and results as explained above with respect to connectivity checker 410. The connectivity checker 510 can also contain other circuitry 530 that is configured to record and/or report the results of the testing as explained above with regard to the in-line embodiment of FIG. 4. The results of the connectivity tester 510 can also be recorded and/or reported through and or to circuitry contained on the board 580, and/or on the hardware component. When indicator 540 indicates a failure, connectivity checker 510 provides the ability to reseat the hardware component, and recheck the hardware component, including the connectivity of the hardware component. The reseating of the hardware component(s) can be performed manually by an agent, or automatically by for example a machine.

A power supply or source 512 in one or more embodiments is provided as part of the connectivity checker 510 that is independent of the power source for the hardware component inserted into the receptacle 580. Connectivity checker 510, in an embodiment further has a power source 512 independent of the power source for the board 580 in which the connectivity checker 510 is plugged into and/or incorporated, e.g., independent of the power source of the information handling system. The power source 512 in an aspect supplies power to the testing circuitry 520. The power source 512 in an embodiment can also supply power to the additional circuitry 530 and/or the indicator 540. In one or more embodiments the power source 512 can be a super capacitor. Additionally and/or alternatively, the power source 512 can be a battery or other power supply able to power the circuitry 520 for the connectivity checker, the other circuitry 530, and/or the indicator and associated circuitry 540. In one or more embodiments the power source for the connectivity checker 510 can be remote from the connectivity checker 510 and attached to (and unattached to) the connectivity checker 510, e.g., leads from a power source connected to the connectivity checker 510.

Figure 6:
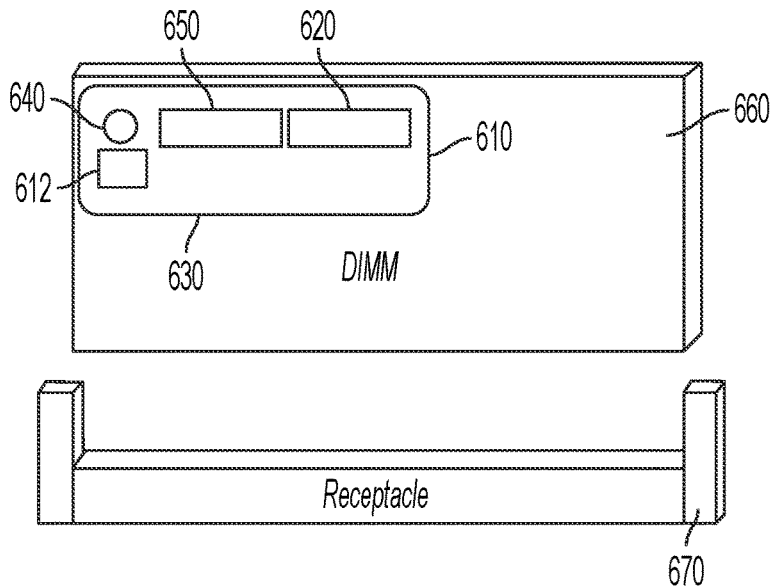
FIG. 6 depicts a further embodiment of a hardware checker system.

FIG. 6 is an example block diagram of an embodiment of a system 600 for checking, testing, and/or verifying hardware components, including in an aspect checking, testing, and/or verifying connectivity of hardware components 660, e.g., a DIMM, card, board, module, FRU, etc., received in (plugged into) one or more receptacles or receivers 670 mounted on a board, e.g., a motherboard. One or more receptacles or receivers 670 are attached to, and electrically connected to a card, board, module, and/or FRU (not shown) containing electrical circuits. The system 600 in the embodiment of FIG. 6 includes connectivity checker 610 embedded or incorporated in the component hardware 660. That is, testing circuitry 620 in an embodiment is incorporated into and embedded into the hardware component 660, e.g., a DIMM. In an alternative embodiment, connectivity checker 610 can be mounted on or part of a card and/or board that is plugged into a receptacle or receiver mounted on the board of the component hardware 660.

The connectivity checker 610, preferably in an embodiment has circuitry 620 to test the connectivity between one or more hardware components 660 received in the one or more receptacles 670. The test circuitry 620 can be relatively simple to check if the electrical connections of the hardware component 660 in the receptacle 670 are sound. Additionally and/or alternatively the test circuitry can be more complex and check for faulty hardware and/or communication errors. The test circuitry 620 in an aspect is built into the connectivity checker 610 including into the component hardware 660 and in one or more embodiments can be built-in, self-test circuitry. For example, in an embodiment, the connectivity checker 610 contains built-in self-test circuitry 620 that initiates testing upon insertion of hardware component 660 into a receptacle 670. Additionally and/or alternatively, the checker 610 can include a mechanism 650, e.g., a button or latch, that can be activated by an agent to start and/or run the checks and tests. The connectivity checker 610 in accordance with one or more embodiments contains other physical circuitry 630.

In an aspect connectivity checker 610 further contains an indicator 640 that can alert an agent to one or more conditions, such as, for example, initiation of the test, completion of the test, and/or the results of the test. The indicator 640 can provide a visible display or indication, and/or an audible indication as explained above with respect to in-line connectivity checker 410. The results of the connectivity tester 610 can also be recorded and/or reported through and or to circuitry contained on the hardware component 660, and/or to the board on which the one or more receptacles 670 are mounted. When indicator 640 indicates a failure, connectivity checker 610 provides the ability to reseat the hardware component 660 in the receptacle 670, and recheck the hardware component 660, including the connectivity of the hardware components 660. The reseating of the hardware component(s) 660 can be performed manually by an agent, or automatically by for example a machine.

A power supply or source 612 in one or more embodiments is provided to the connectivity checker 610 that is independent of the power source for the hardware component 660. Connectivity checker 610, in an embodiment further has a power source 612 independent of the power source for the board to which the receptacle 670 is mounted. The power source 612 in an aspect supplies power to the testing circuitry 620. The power source 612 in an embodiment can also supply power to the additional circuitry 630 and/or the indicator 640. In one or more embodiments the power source 612 can be a super capacitor. Additionally and/or alternatively, the power source 612 can be a battery or other power supply able to power the circuitry 620 for the connectivity check, the other circuitry 630, and/or the indicator 640. In one or more embodiments, the power source 612 can be remote from connectivity checker 612 and attached to (or unattached from) the connectivity checker 610.

While the embodiments of FIGS. 4-6 have used the term connectivity checker 410, 510, and 610, it should be understood that the terminology should not be used to limit the type of testing to connectivity checking, but can cover a number of testing, checking, and verification processes, including hardware faults or failures, communication errors, in addition to connectivity (proper electrical contact) testing. For example, circuitry with a built in self test (BIST) that interacts with the card, board, module, and/or FRU after the connectivity test is completed can be performed to compare expected versus actual results. The tests in one or more embodiments would be specifically tailored for each card, board, module, and/or FRU. The tests could define what inputs and/or outputs to expect and derive a test for verification. For example, capacitance, inductance, resistance, and/or other properties could be measured and compared to expected values. One of ordinary skill in the art can appreciate the types of testing, checking, and/or verification procedures that would be appropriate for the system and apparatus discussed in FIGS. 4-6.

Figure 7A:
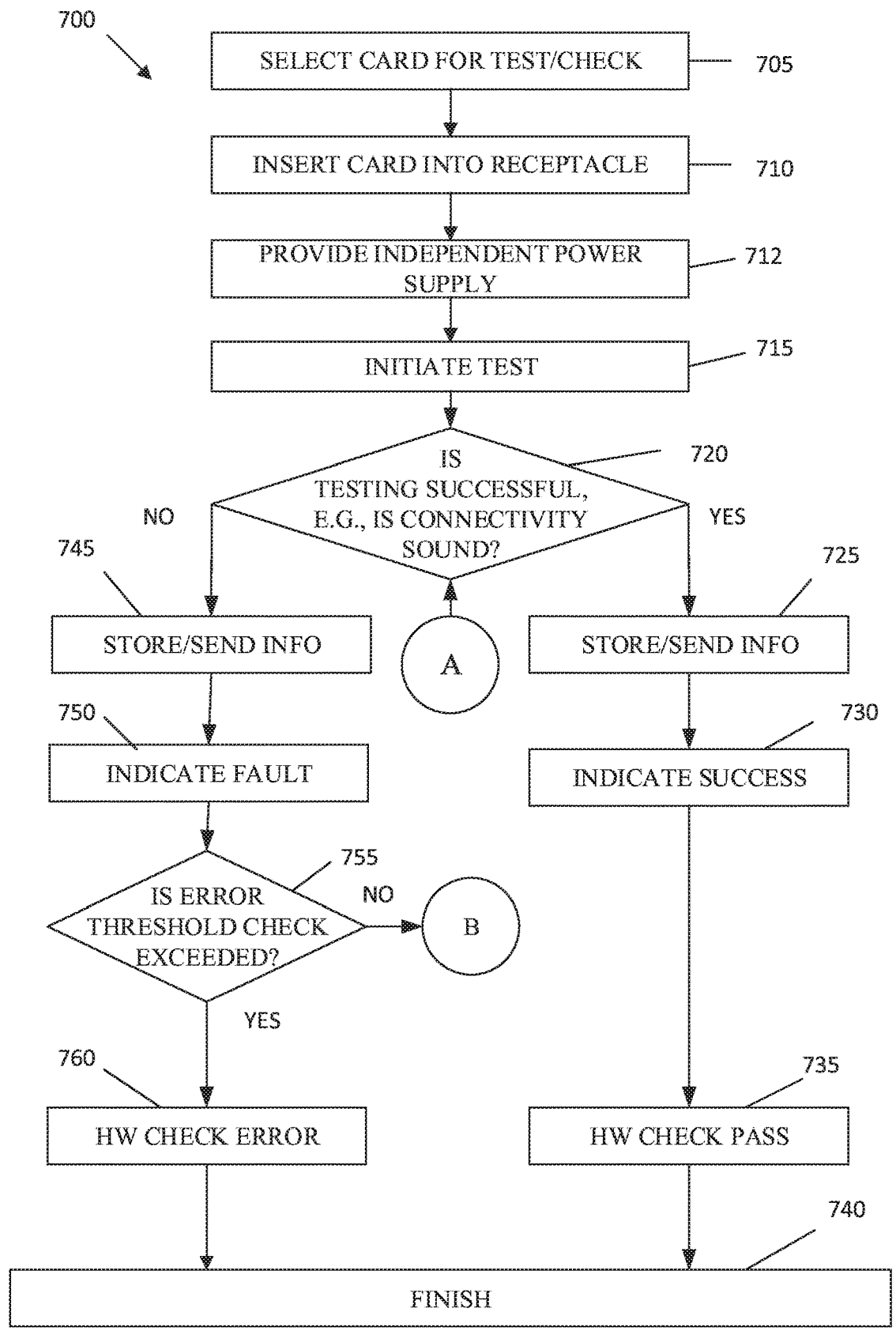
FIGS. 7A & 7B depict a flow diagram of a method of checking connectivity of hardware components in accordance with an embodiment.
Figure 7B:
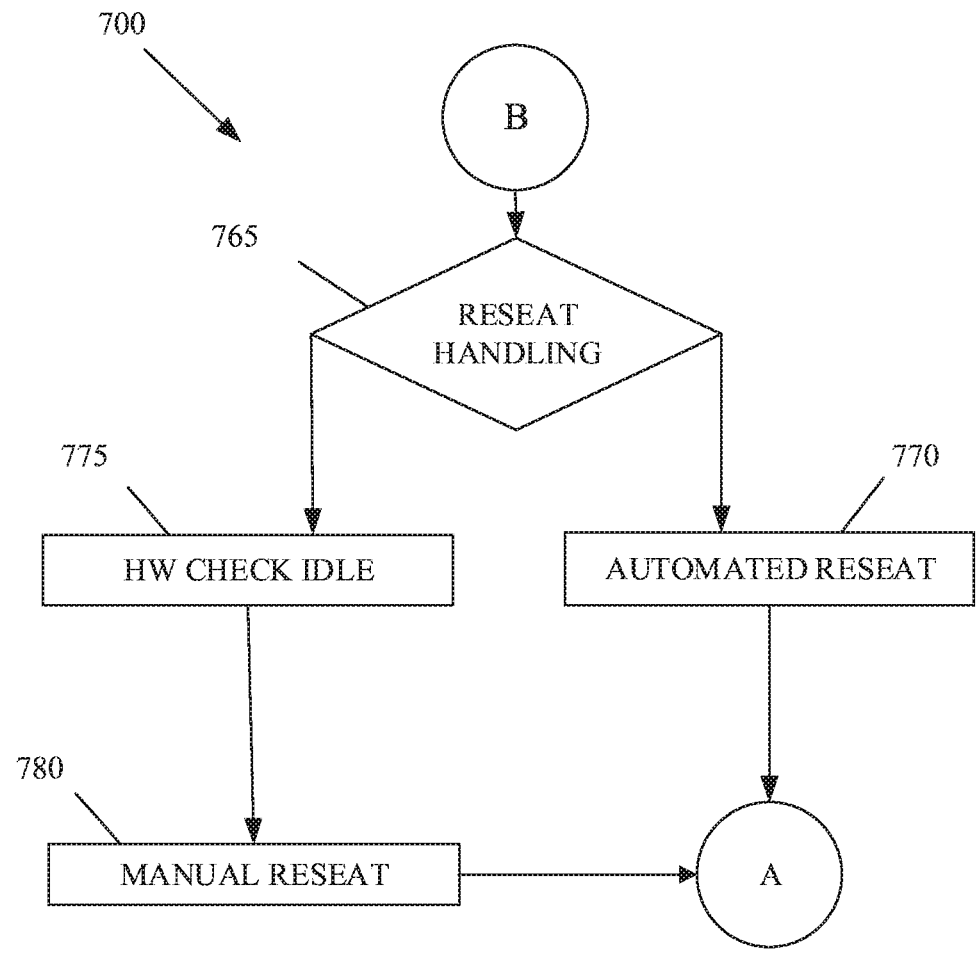

FIGS. 7A & 7B illustrate an exemplary flowchart in accordance with an embodiment illustrating and describing a method of checking, testing, and/or verifying hardware components, including a method of performing connectivity checks or testing on circuits, hardware components, component cards, boards, modules, FRUs, and the like, including a method of performing connectivity checks or verification prior to power-on of the circuits associated with the hardware, component cards, modules, boards, FRUs, and the like. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIGS. 7A & 7B, but the process may be integrated and/or one or more steps may be performed together, simultaneously, or the steps may be performed in the order disclosed or in an alternate order.

In an embodiment, the method 700 of checking hardware components, including in an aspect checking, testing, and/or verifying the connectivity of a hardware component, card, module, and/or FRU is disclosed. For ease of discussion, method 700 will be discussed in the context of a card containing information handling circuitry, but it will be appreciated that one or more hardware components other than cards would be covered by method 700, including for example testing of modules, boards, and/or FRUs. The method 700 at 705 includes selecting or providing the card to be tested. At 710 the card is inserted into a receptacle. In the case of the in-line connectivity tester of FIG. 4, the card would be inserted into the in-line insert.

At 712, in an aspect, power is supplied to the one or more testing circuits, the additional circuitry, and/or the indicator circuitry. In one or more embodiments, the power supply for the testing, e.g. for connectivity tester 410, 510, 610, is independent of the power supply to operate the information handling circuitry on the card, and/or independent of the power supply to operate the board on which the receptacle is mounted. In this regard it is preferred if the power supply is independent of the system that is being tested, e.g., independent of the power that would be supplied to the information handling system. In one or more embodiments, the connectivity tester has a built in power supply, for example a super capacitor, battery, or other power supply to provide power to the circuitry to perform the checking, including specifically in an embodiment connectivity checking, verifying, and/or testing. In the case of the in-line connectivity tester that is an insert that is received in a receptacle, the insert preferably has a power supply independent of the card and/or the receptacle/board on which the card is mounted. In the case where the testing circuitry (and/or the additional circuitry and/or indicator) is mounted on or embedded in the board on which the receptacle that receives the card is mounted, or the testing circuitry is on the card, the power supply preferably is independent of the power for the operation of the information handling circuits on the board and/or the card, and in an embodiment has a separate and independent built-in power supply. Additionally and/or alternatively, an independent power supply can be connected to the connectivity tester, for example, by connector leads from a power source to the tester circuitry.

At 715 one or more tests, checks, and/or verifications are initiated. For ease of reference, the method 700 will be described using reference to the term "test", but it will be recognized that the method has application to tests, checks, and/or verifications. In an aspect, the test can check for hardware failure or faults, communication errors, and/or connectivity issues, although other testing is contemplated. The test can be initiated by the act of inserting the card into the receptacle. The test additionally and/or alternatively can be initiated by pressing a button or other mechanism. The test is performed, the testing is completed, and/or the results of the testing are collected, e.g., where multiple tests are performed, and at 720 it is determined whether or not there is a fault condition or failure, e.g., a faulty connection or a successful connection. For example, a green LED that is lit up can indicate a sound connection, no communication errors, and/or fault free hardware. If the testing indicates the hardware is sound, e.g., the electrical connection is sound (720: Yes), then the process 700 proceeds to 725 and the results of the testing can be collected and/or stored. At 730 where the testing is successful the results can be reported. At 735 the hardware check is indicated as a pass, and the process proceeds to 740 where the testing and reporting is finished.

At 720, if the testing fails (720: No), the process 700 continues to 745 where the results of the testing in an embodiment are collected and/or stored. At 750 the fault or unsuccessful results are reported and/or indicated as a failure or fault. For example, the indicator can light yellow if a re-seat of the card required, or red for hardware error. The method 700 proceeds to 755 where a threshold error is checked. For example, a threshold can be entered for how many reseat or retries of the card are permitted, and if the number of retries is exceeded (755: Yes), the method proceeds to 760 and the hardware check error is performed where the card is identified for removal. The method 700, after 760 where the faulty card is identified, moves to 740 where the testing of the card is finished and complete. A counter may be included, and before 755, and on or about step 750, after the card has failed, the counter can be incremented. The threshold number of tries may be predetermined, changed, programmed, and the threshold would be compared to the value in the counter representing the number of retries the card has been tested.

If at 755 the error threshold is not exceeded (755: No), the method 700 proceeds to reseat handling at 765. At 765 a decision is made as to how to handle the card. In one aspect the process continues at 770 to automated reseating where reseating is handled automatically and after the card is re-seated the method continues to 720 where the card is checked again and the process continues from 720. In another aspect, the process proceeds to a hardware check idle at 775 so as to permit the agent to reseat the card in the receptacle at 780. After 780 the method 700 continues to determine whether or not the testing is successful at 720, e.g., is the connectivity sound, and the process continues from step 720. It is contemplated that the process at 765 can continue according to other aspects other than the automated or manual response described above.

Figure 8:
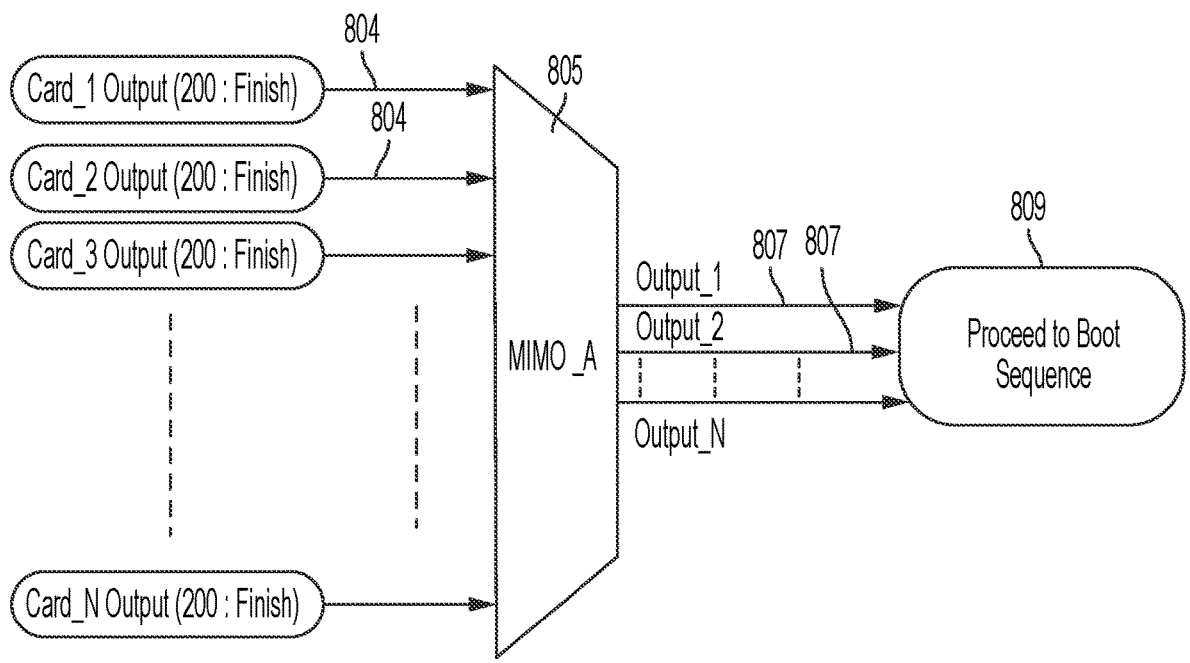
FIG. 8 depicts a further flow diagram of a method of checking connectivity of hardware components in accordance with an embodiment.

FIG. 8 represents a further implementation of an example embodiment of a connectivity checker where a multiple input multiple output (MIMO) control 805 is implemented to receive as inputs the results of testing performed on multiple cards. In the embodiment of FIG. 8, multiple inputs are received by MIMO 805 from tests run on multiple cards. For example, the results at 740 from the process 700 for each card tested are inputs 804 for MIMO 805. The one or more outputs 807 of MIMO 805 are defined for each embodiment based upon desired criteria that can be varied and the output of MIMO can range from 1 to N outputs. The one or more outputs 807 of the MIMO 805 are fed as input to the underlying information processing system for use during the boot or power-on sequence 809.

While the illustrative embodiments described above include hardware, such as circuitry, receptacles, cards, boards, modules, and/or FRUs, various aspects of the illustrative embodiments and/or techniques may include and/or be implemented in software as well. For example, it will be understood that one or more of the blocks of the flowchart illustrations in FIGS. 7-8, and combinations of blocks in the flowchart illustration, can be implemented by computer program instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that one or more blocks of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for checking one or more hardware components in an information handling system, the method comprising:
    selecting a hardware component for testing;
    supplying power to the hardware component independent from the power supply provided by the information handling system during a power-up sequence;
    performing testing on the selected hardware component using power supplied by the independent power supply;
    determining the success or failure of the testing on the selected hardware component;
    indicating the result of the testing on the selected hardware component; and
    if the result of the testing on the selected hardware component is successful indicating the hardware component passed the testing, and
    if the result of the testing on the selected hardware component is not successful compare a number of times testing of the hardware component has been performed to a threshold, and if the number of times the hardware component has been tested is less than the threshold, re-seating the hardware component and performing the testing on the selected hardware again using power supplied by the independent power supply, and if the number of times testing on the hardware component has been performed is equal to or greater than the threshold, indicate the hardware component as a failure.

2. The method according to claim 1, further comprising inserting the hardware component into a receptacle on a board.

3. The method according to claim 2, wherein inserting the hardware component into a receptacle on a board includes plugging an in-line insert into the receptacle and inserting the hardware component into the in-line insert.

4. The method according to claim 1, wherein the hardware component comprises one or more electrical circuits arranged on a board, a card, a module, or a field replacement unit (FRU).

5. The method according to claim 1, wherein the testing comprises checking for at least one of a group consisting of faulty hardware, communication errors, connectivity issues, and combinations thereof.

6. The method according to claim 1, wherein the independent power supply consists of at least one of a group consisting of a capacitor, a supercapacitor, a battery, and combinations thereof.

7. The method according to claim 1, wherein supplying power to the hardware component includes connecting an independent power source to the testing circuitry.

8. The method according to claim 1, further comprising initiating the testing in response to plugging the component hardware into a receptacle.

9. The method according to claim 1, further comprising initiating the testing in response to an agent activating a physical mechanism.

10. The method according to claim 9, wherein the physical mechanism comprises depressing a button.

11. The method according to claim 1, wherein indicating the result of the testing comprises activating a visible display.

12. The method according to claim 1, wherein re-seating the hardware component comprises at least one of a group consisting of manually and automatically re-seating the hardware component.

13. The method according to claim 1, wherein the threshold is a predetermined number of testing performances of the hardware component.

14. A method for testing the connectivity of one or more cards in an information handling system, the method comprising:
inserting one or more cards into one or more receptacles in the information handling system, each card containing multiple circuits for performing operations in connection with the information handling system and each card has multiple connections with its respective receptacle in which it is inserted;
supplying power to testing circuitry associated with the one or more cards, wherein the power supplied to the testing circuitry is different than and independent from the power supply for operating the multiple circuits for performing information handling system operations contained on each card;
testing the one or more cards using the independent power supply before the information handling system undergoes a power on sequence using the power supply for operating the multiple circuits for performing operations in connection with the information handling system;
providing a multiple input multiple output (MIMO) device having multiple inputs; and
receiving by each of the multiple inputs of the MIMO a result of the testing of the one or more cards.

15. The method according to claim 14, further comprising using the output of the MIMO in the power on sequence of the information handling system.

16. The method according to claim 14, further comprising:
inserting one or more inserts into the one or more receptacles wherein the inserts contain the testing circuitry, and
inserting the one or more cards into a socket formed in the insert.

17. A system for checking hardware components in an information handling system for handling and processing information and having a power supply, the system comprising:
an inline insert for receiving one or more hardware components to be tested, the inline insert plugged into a receptacle on the board;
circuitry for testing the one or more hardware components in the information handling system;
an indicator for reporting results of testing the one or more hardware components; and
a testing power source to supply power to the circuitry for testing the one or more hardware components and to report the results of the testing of the one or more hardware components,
wherein the testing power source to supply power to the circuitry for testing and reporting the results of the testing of the one or more hardware components is separate and independent of the power supply of the information handling system.

18. The system according to claim 17, wherein the circuitry for testing and the indicator reporting the results of the testing of the one or more hardware components is incorporated into at least one of a group consisting of the hardware component; the circuitry of the information handling system that is separate from the one or more hardware components; an in-line insert that is received in a receptacle and that receives the hardware component; and combinations thereof.

* * * * *